US005395478A

United States Patent [19]

Sattler et al.

[11] Patent Number: 5,395,478

[45] Date of Patent: Mar. 7, 1995

[54] DEVICE FOR APPLYING HEAT-TRANSFERRABLE DECALCOMANIA TO A CURVED CONTAINER SURFACE

[76] Inventors: David M. Sattler, 2967 Stanley Rd., Fairlawn, Ohio 44333; William C. Cox, 1216 Watermark Ct., High Point, N.C. 27265

[21] Appl. No.: 171,096

[22] Filed: Dec. 21, 1993

[51] Int. Cl.$^{6}$ .......................... B32B 31/00; B21D 5/02

[52] U.S. Cl. .................................... 156/481; 156/475; 156/215; 156/240; 156/493; 156/DIG. 41; 156/494

[58] Field of Search ............... 156/215, 240, 540, 541, 156/542, 475, 492, 493, 494, 481, DIG. 41

[56] References Cited

U.S. PATENT DOCUMENTS

| | | | |
|---|---|---|---|
| 3,117,904 | 1/1961 | Black | 156/475 X |
| 3,899,913 | 8/1975 | Schlosser | 72/383 X |
| 5,019,193 | 5/1991 | Aramini | 156/64 X |

*Primary Examiner*—Michael W. Ball
*Assistant Examiner*—Charles Rainwater

[57] ABSTRACT

An improvement in a device for applying heat-transferrable decalcomania to a generally curved container surface such as a mug comprising a multiple segment tightening band surrounding a cushioned blanket surrounding a heating element, the segments being hingedly connected so that the band firmly applies the cushioned blanket heating element against the decalcomania and the contiguous curved container surface to effect transfer of the decalcomania design to the container surface.

4 Claims, 2 Drawing Sheets

DEVICE FOR APPLYING HEAT-TRANSFERRABLE DECALCOMANIA TO A CURVED CONTAINER SURFACE

BACKGROUND OF THE INVENTION

1. Field of the Invention

The invention relates generally to a device for applying heat-transferrable decalcomania to a curved container surface, and more particularly, to an improvement in the positioning of the heating element against the decalcomania and the surface by a novel tightening band.

2. Description of the Prior Art

It is known to apply a heat-transferrable decalcomania, commonly known as a decal, to articles positioned on flat surfaces. It is also known to apply such decals to curved surfaces so long as uniform pressure and temperature is applied over the entire expanse of the decal and, in turn, over the cylindrical surface overlaid with the decal. For example, rigid, bulky, heated and curved metal castings have been used to engage one side of the surface of a mug, and in some instances two such castings have been hinged together to encompass opposite sides of the mug.

It is also a part of the prior art to utilize a flexible blanket with a contained heater to encircle a curved surface article such as a mug so that when the blanket is tightened it snugly engages the surface and enables the transfer of the design from the decal to the mug surface when the heater is activated. Such blankets provide satisfactory results, however, tensioning the blanket sometimes is less than fully satisfactory since the blanket either slides along the mug surface, thus damaging the decal, or it does not uniformly engage with radial pressure the entire curved surface of the mug to be printed. Thus there is a need to utilize another component to effectively press the blanket and its contained heater uniformly against the mug curved surface in order to effect totally satisfactory application of decals.

SUMMARY AND OBJECTIVES OF THE INVENTION

It is the general object of this invention to overcome drawbacks such as those previously discussed of prior art arrangements for applying decals to mugs.

It is another object of this invention to reliably affix a decal to a major portion of the curved surface of a container.

Yet another object of the present invention is to uniformly apply pressure and heat over the entire expanse of the decal to be affixed to a mug.

Yet still a further object of the present invention is to provide a new and improved device for applying heat-transferrable decalcomania to a circumferential surface of a container which has all of the advantages of prior art devices and none of the disadvantages.

In keeping with these objectives and others which will become apparent hereinafter, the present improvement in a device for applying heat-transferrable decalcomania to a generally curved container surface primarily consists of a multiple segment tightening band surrounding a cushioned blanket and contained heating element. The segments are hingedly connected and move to securely encompass the blanket and its contained heating element to wrap it around the curved mug surface and provide uniform radial pressure against the decal and that surface to achieve efficient decal transfer to the surface. The tightening band and its cooperating and encircled blanket engages the curved mug surface by a downward movement of a lever arm cooperatively secured to the blanket and band to surround and engage the mug surface in a uniform and positive manner. The blanket is formed of sponge rubber, to which is adhered a silicon rubber calender interfaced to a silicon rubber sheet which holds the heating elements. Another silicon rubber calender encapsulates the heating elements and supports a sheet of fiberglass fabric coated with teflon. Suitable controls are provided to actuate the heater contained in the blanket and effect decal transfer. A timing mechanism automatically terminates the operation of the machine after passage of the necessary time period for decal transfer to take place. Means for varying the pressure to accommodate mugs of differing diameters are also included.

Thus, there has been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

BRIEF DESCRIPTION OF THE DRAWINGS

The invention will be better understood and objects other than those set forth will become apparent when reference is made to the accompanying drawings and descriptive matter in which like characters of reference designate like parts throughout the several views and wherein.

DETAILED DESCRIPTION OF THE PREFERRED EMBODIMENT

Figure 1:
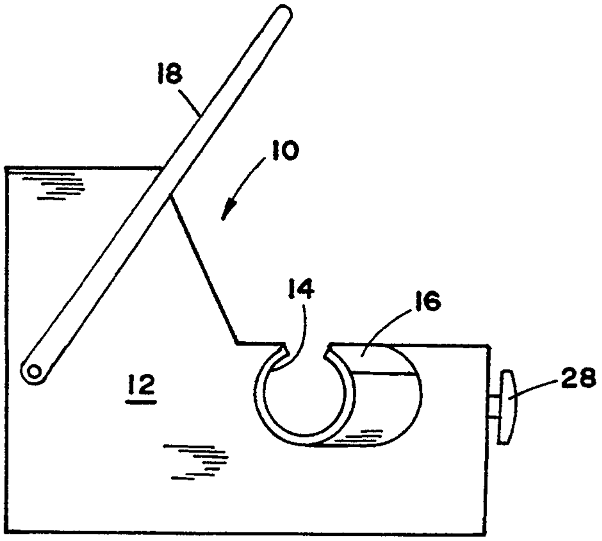
FIG. 1 is a side elevational view of a decalcomania transfer device utilizing the multiple segment tightening band comprising the present invention with the machine in the open or mug receiving position.
Figure 2:
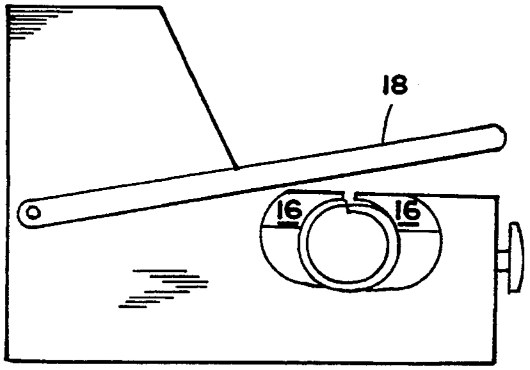
FIG. 2 is a side elevational view of the machine in FIG. 1 wherein the machine is in the mug encompassing or closed position.
Figure 3:
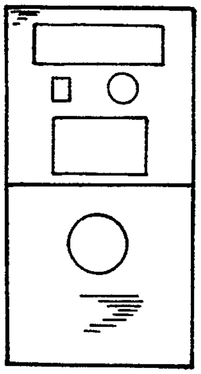
FIG. 3 is an end elevational view of the machine shown in FIGS. 1 and 2.
Figure 9:
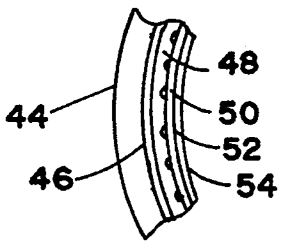
FIG. 9 is an enlarged, side elevational, sectional, and fragmentary view of the blanket off the present invention and its carried heating elements.

Referring now to the drawings, reference numeral 10 generally identifies a decalcomania transfer device having a body 12, a cushioned flexible blanket 14 and supports 16 which movably maintain the ends of blanket 14. A lever arm 18 is mechanically affixed to one support 16 (not shown) to move that support and its affixed blanket end to the open position (FIG. 1) to enable the positioning of a mug for printing and then to a closed position (FIG. 2) to the mug securing position to effect decal transfer. A tightening screw 20 is mechanically linked to the other support 16 to enable it to be moved to a more open or a more closed position to accommodate larger or smaller mugs. Blanket 14 contains a heating element (not shown) of a conventional design so that when blanket 14 and the contained element are positioned about the surface of a mug and against a decal, transfer of the decal to the mug surface takes place upon the application of heat. Blanket 14 is releasably secured to supports 16 by velcro strips 40 so that it can be quickly replaced in the event a blanket of a differing size is required. The preferred blanket construction is shown in FIG. 9 wherein an exterior layer of sponge rubber 44 is affixed to a silicon rubber calender 46 to which is bonded a layer of silicon rubber 48. Heating elements 50 are positioned proximate the rubber layer 48 and covered with another section of silicon rubber calender 52. The interior of the blanket is structured from a layer of fiberglass fabric coated with teflon 54.

Figure 4:
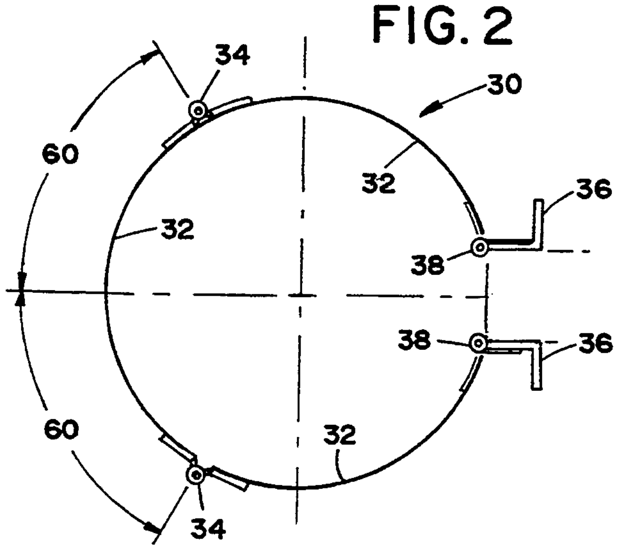
FIG. 4 is an enlarged and side elevational view of the multiple segment tightening band comprising the improvement of the present invention.
Figure 5:
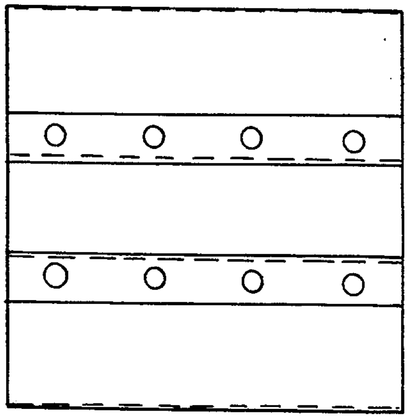
FIG. 5 is an end elevational view of the band shown in FIG. 4.
Figure 6:
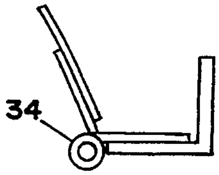
FIG. 6 is an enlarged, side elevational and fragmentary view of a hinged segment of the band shown in FIGS. 4 and 5.
Figure 7:
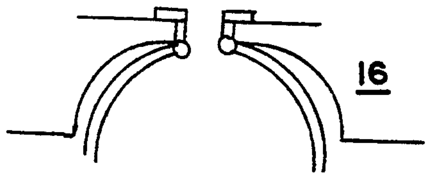
FIG. 7 is an enlarged, side elevational and fragmentary view of the end of the band and their clamping to urge the blanket and heater against the decalcomania and the container surface.
Figure 8:
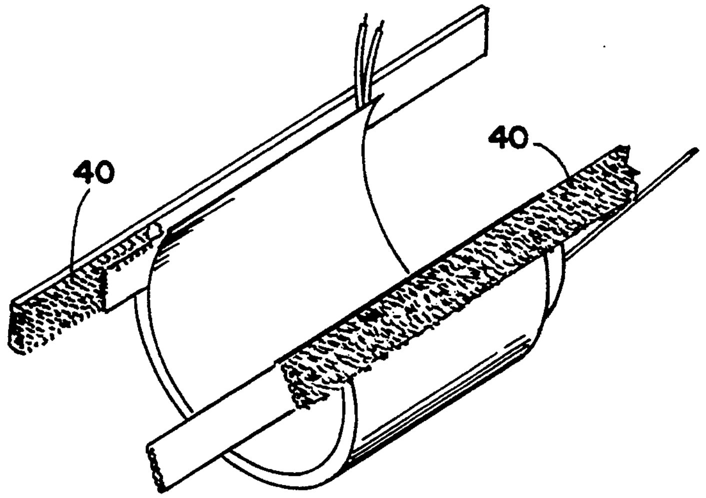
FIG. 8 is a perspective, isolated view of the blanket utilized in the present inventive concept.

The multiple segment tightening band, shown generally as 30 in FIG. 4, is formed of a plurality of arcuate sections 32 fastened together by movable hinges 34. Special attachment members 36 are affixed to the terminal ends 38 of band 30 by hinges 39 of a design to enable securement to supports 16 as shown in detail in FIG. 7.

The hinged nature of band 34 enables it to more securely encompass the curved surface of a mug and thereby to provide more efficient and even pressure in a radial direction against the decal positioned between blanket 14 and the heating element and the surface of the mug. Decal transfer is obtained in a much more efficient and reliable manner by use of this flexible band than has heretofore been achieved through a single non-hinged band or through direct pressure exerted by the blanket and heater contained therein. It has been found most effective to hinge the single middle segment 32 at 60 degree angles from the horizontal diameter of the band as shown in FIG. 4, however, other configurations can be utilized with quite satisfactory results.

With respect to the above description, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed herein. Therefore, the foregoing is considered as illustrative only of the principles of the invention. Further, since numerous modifications and changes will readily occur to those skilled in the art, it is not desired to limit the invention to the exact construction and operation shown and described. All suitable modifications and equivalents that fall within the scope of the appended claims are deemed within the present inventive concept.

What is claimed is:

1. In a device for applying heat-transferrable decalcomania to a generally curved container surface having a frame, a container receiving recess in the frame, a cushioned blanket heating element having two free ends positioned in the recess to secure the container surface, a blanket securing element secured to the blanket heating element free ends operable to tighten the blanket heating element around a portion of the container surface on which the decalcomania has been positioned to press the decalcomania against the container surface, and means to actuate the blanket securing element, the improvement comprising: a tightening band having at least three segments surrounding the cushioned heating element cooperatively secured to the blanket securing element at the blanket heating element free ends, the segments each being arcuately shaped and having two free ends and being hingedly connected at the free ends and movable to engage and urge the cushioned blanket heating element against the decalcomania and the underlying contiguous curved container surface upon operation of the actuation means, each of the segments being nonoverlapping with each other and completely contiguous with the decalcomania.

2. The improvement as claimed in claim 1 wherein the blanket heating element includes a plurality of rubber sheets and a plurality of heating coils encompassed thereby.

3. The improvement as claimed in claim 1 wherein the connected segments are formed from low gauge mild steel.

4. The improvement as claimed in claim 2 wherein the connected segments are formed from low gauge mild steel.

* * * * *